(12) United States Patent
Kim

(10) Patent No.: US 8,181,607 B2
(45) Date of Patent: May 22, 2012

(54) ANIMAL TRAINING DEVICE AND METHOD OF CONTROLLING THE SAME

(76) Inventor: Yong Won Kim, Seoul (KR)

( * ) Notice: Subject to any disclaimer, the term of this patent is extended or adjusted under 35 U.S.C. 154(b) by 321 days.

(21) Appl. No.: 12/688,361

(22) Filed: Jan. 15, 2010

(65) Prior Publication Data

US 2011/0094454 A1 Apr. 28, 2011

(30) Foreign Application Priority Data

Oct. 23, 2009 (KR) .................. 10-2009-0101121
Oct. 23, 2009 (KR) .................. 10-2009-0101125

(51) Int. Cl.
*A01K 15/02* (2006.01)
(52) U.S. Cl. ................ 119/720; 119/719; 119/908
(58) Field of Classification Search ........... 119/712, 119/718, 719, 720, 905, 908, 859, 174; 340/573.1, 340/573.3, 573.4
See application file for complete search history.

(56) References Cited

U.S. PATENT DOCUMENTS

| | | | | | |
|---|---|---|---|---|---|
| 4,335,682 A | * | 6/1982 | Gonda et al. | ................ | 119/719 |
| 5,465,687 A | * | 11/1995 | Custer | ................ | 119/719 |
| 5,605,116 A | * | 2/1997 | Kim et al. | ................ | 119/720 |
| 5,666,908 A | * | 9/1997 | So | ................ | 119/720 |
| 6,474,269 B2 | * | 11/2002 | So | ................ | 119/720 |
| 6,598,563 B2 | * | 7/2003 | Kim et al. | ................ | 119/720 |
| 6,860,240 B2 | * | 3/2005 | Kim et al. | ................ | 119/719 |
| 7,607,406 B2 | * | 10/2009 | So | ................ | 119/719 |
| 7,819,087 B2 | * | 10/2010 | Napolez et al. | ................ | 119/721 |
| 2005/0039700 A1 | * | 2/2005 | Gillis et al. | ................ | 119/712 |
| 2006/0196446 A1 | * | 9/2006 | Kates | ................ | 119/719 |
| 2008/0036610 A1 | * | 2/2008 | Hokuf et al. | ................ | 340/573.3 |
| 2008/0236513 A1 | * | 10/2008 | Barlebo-Larsen et al. | ... | 119/719 |
| 2009/0139462 A1 | * | 6/2009 | So | ................ | 119/719 |
| 2011/0061605 A1 | * | 3/2011 | Hardi et al. | ................ | 119/721 |
| 2011/0094454 A1 | * | 4/2011 | Won | ................ | 119/720 |
| 2011/0199217 A1 | * | 8/2011 | So | ................ | 340/573.3 |

* cited by examiner

*Primary Examiner* — T. Nguyen
(74) *Attorney, Agent, or Firm* — Lucas & Mercanti, LLP

(57) ABSTRACT

Disclosed herein is an animal training device and method of controlling the same. The animal training device includes a transmitter and at least one receiver. The transmitter transmits RF signals according to manipulation of function switches, and has emergency stimulation mode in which an RF control signal is transmitted by adding a predetermined level to a low-frequency stimulation level set for each individual animal, simultaneous stimulation mode in which an RF control signal is transmitted by adding a predetermined level to low-frequency stimulation levels set for animals, and constant stimulation alternation mode in which an RF control signal is transmitted by automatically varying a period of a low-frequency stimulation. The receiver sets low-frequency stimulation for a corresponding one of the plurality of animals in response to the RF signals, and selectively performs operations corresponding to the emergency stimulation mode, the simultaneous stimulation mode, and the constant stimulation alternation mode.

7 Claims, 11 Drawing Sheets

[Figure 1]
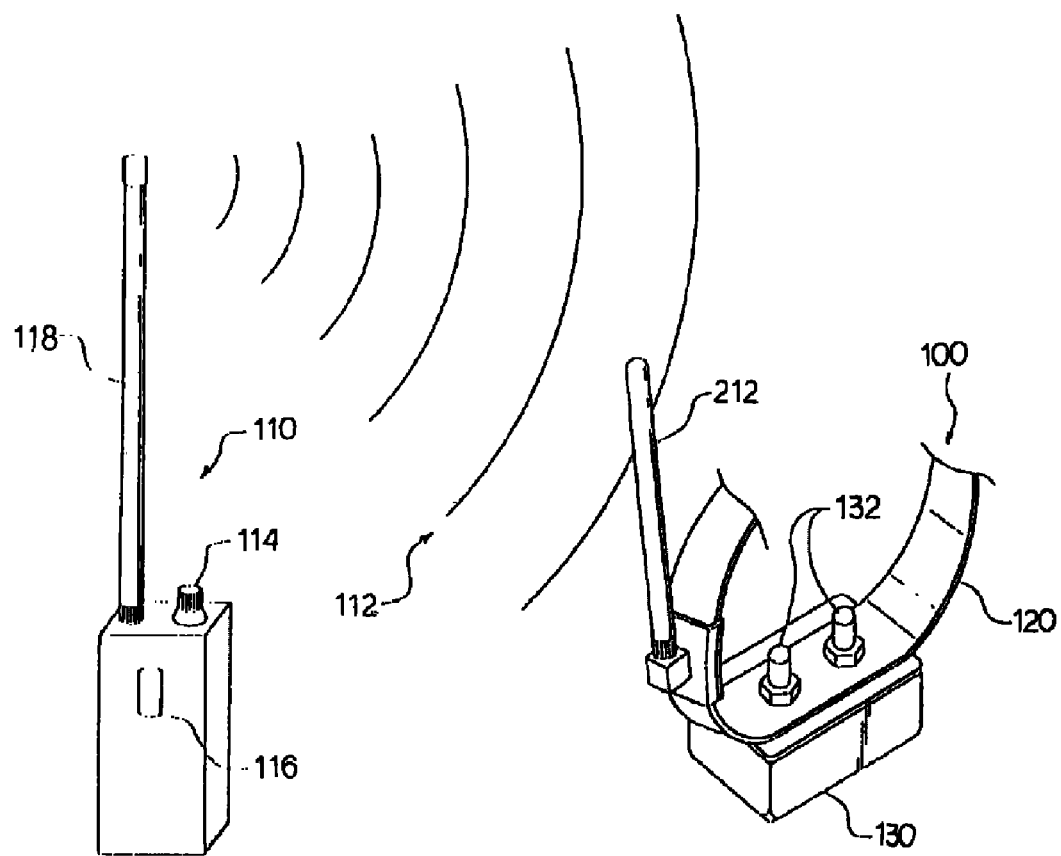

[Figure 2]
200
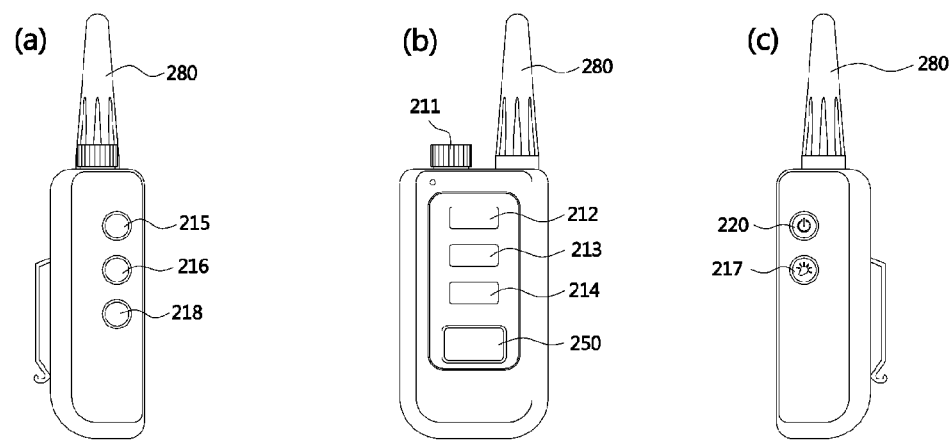

[Figure 3]
300
(a)
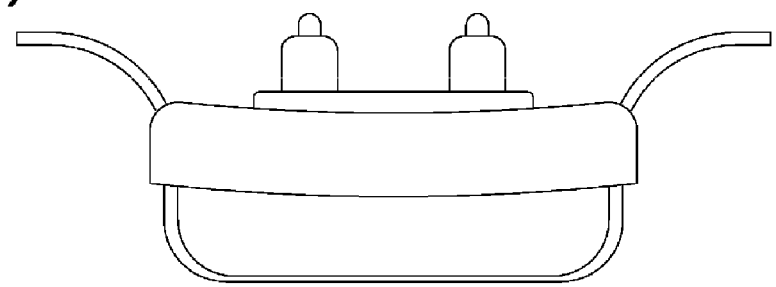
(b)
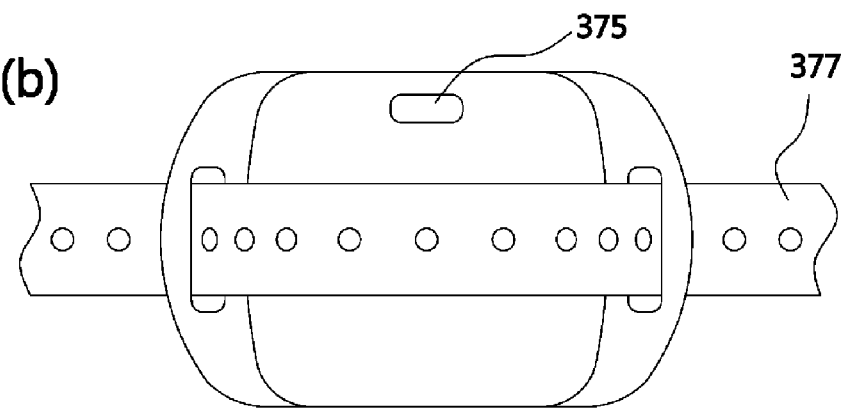
(c)
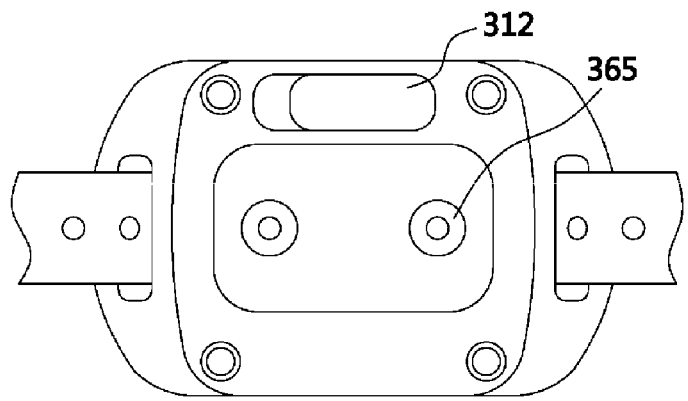

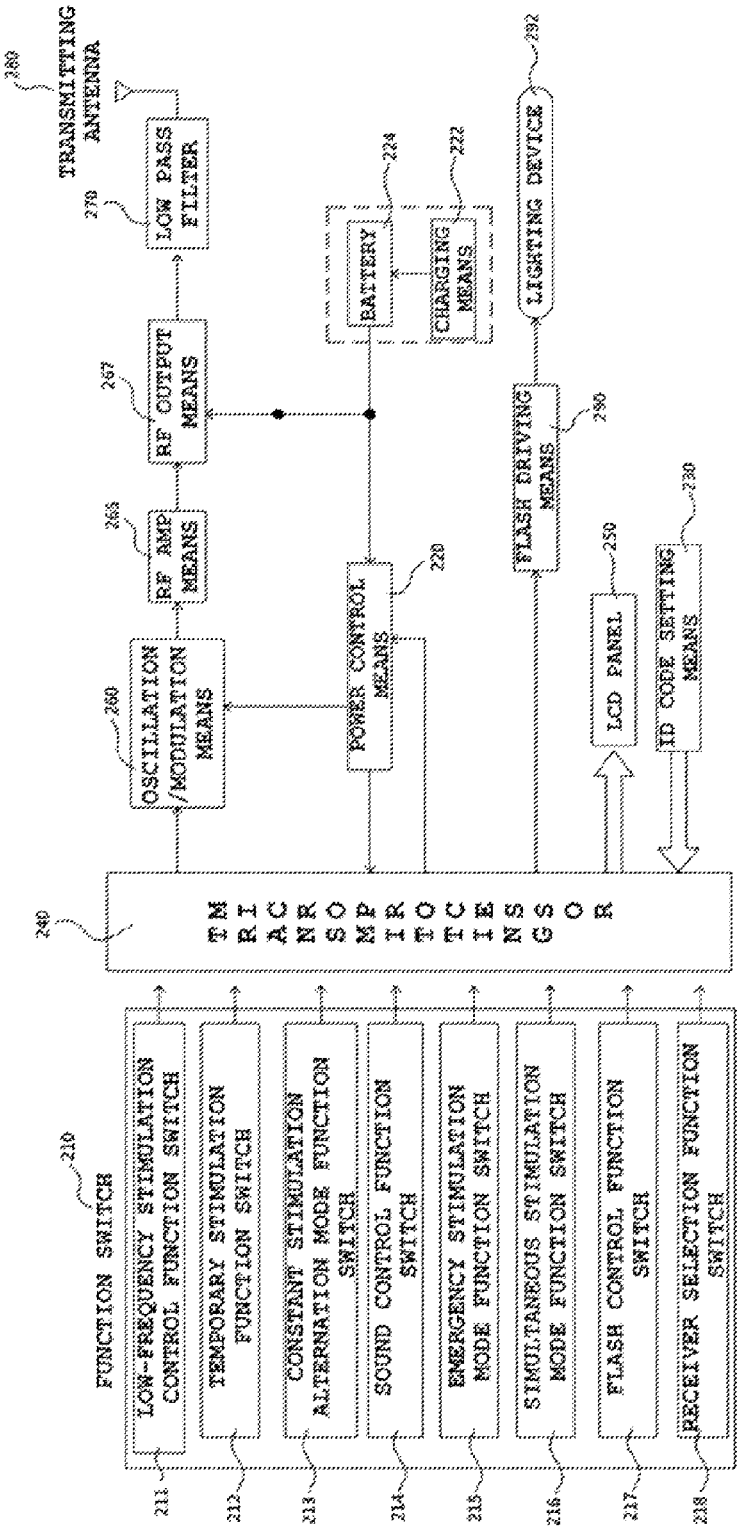

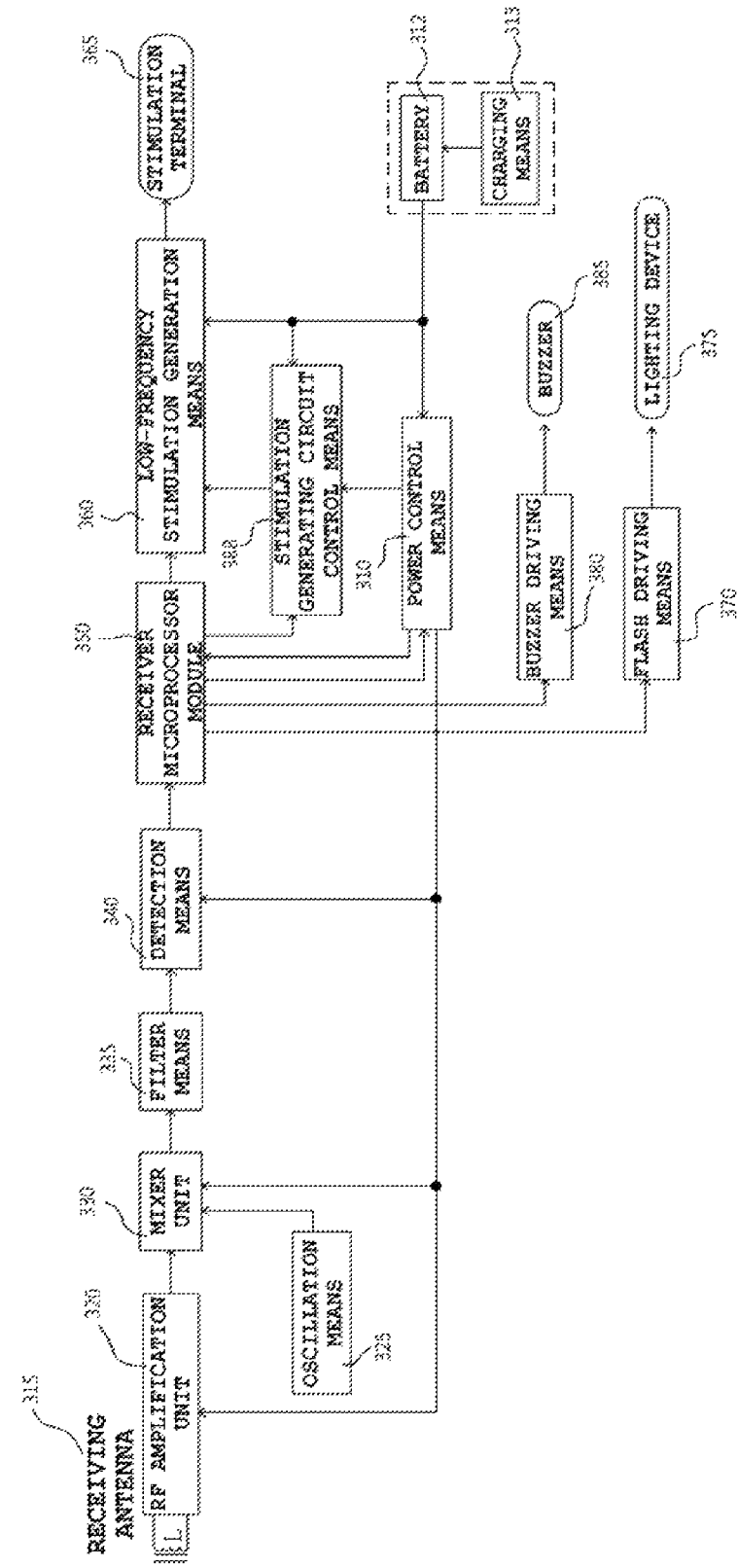
[Figure 5]

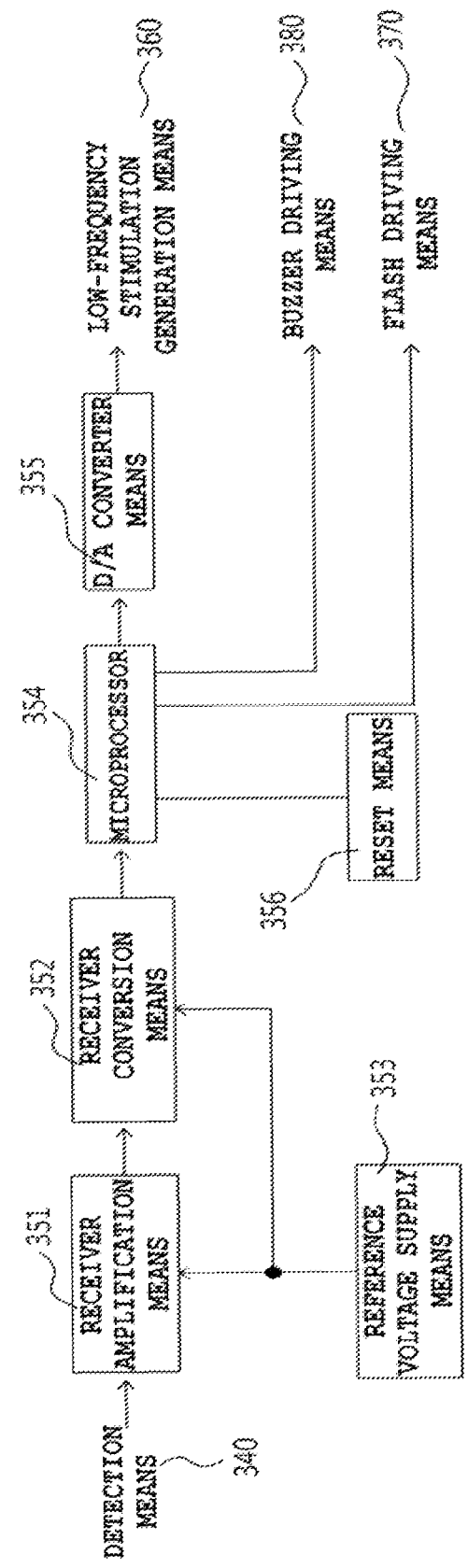
[Figure 6]

[Figure 7]
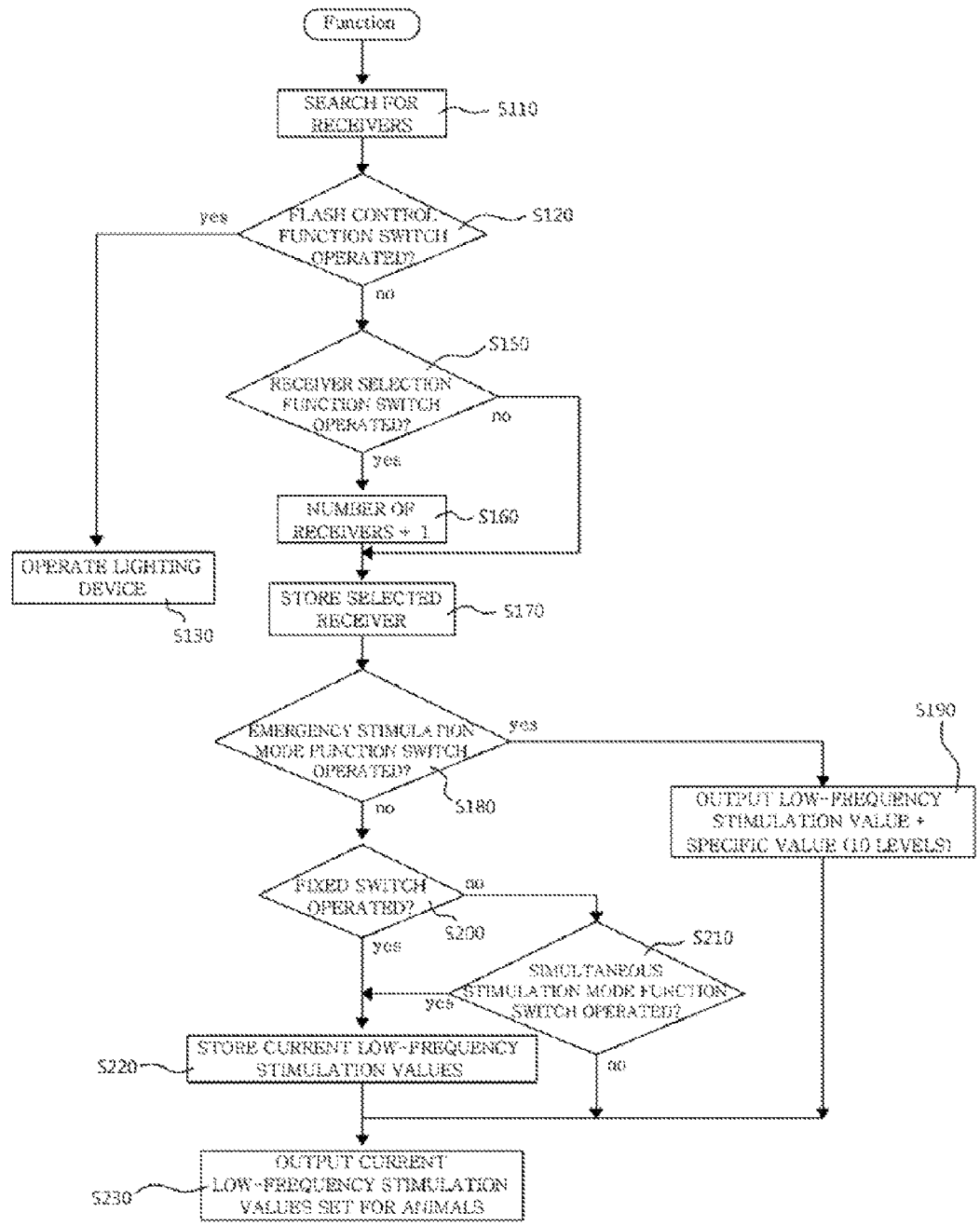

[Figure 8]
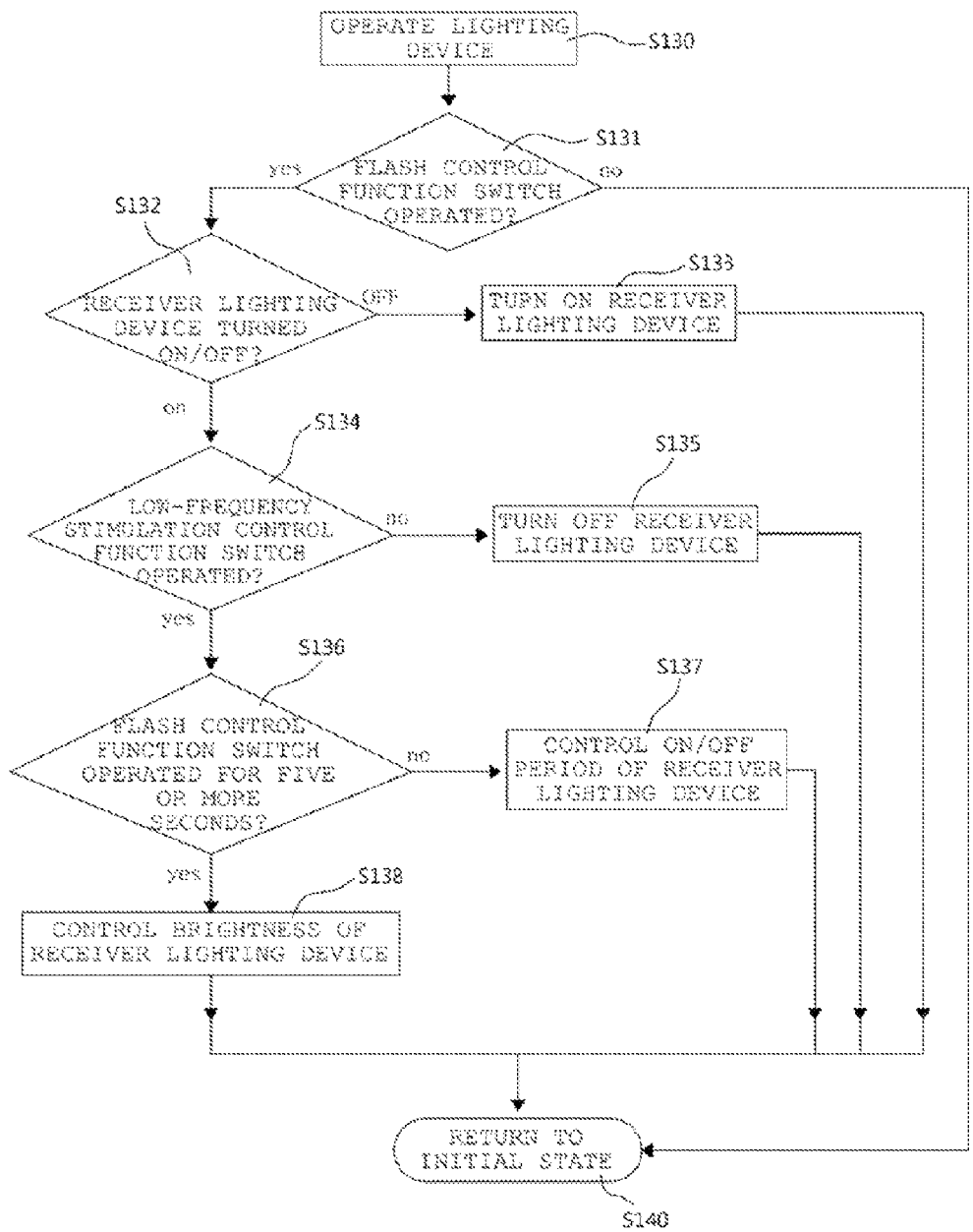

[Figure 9]
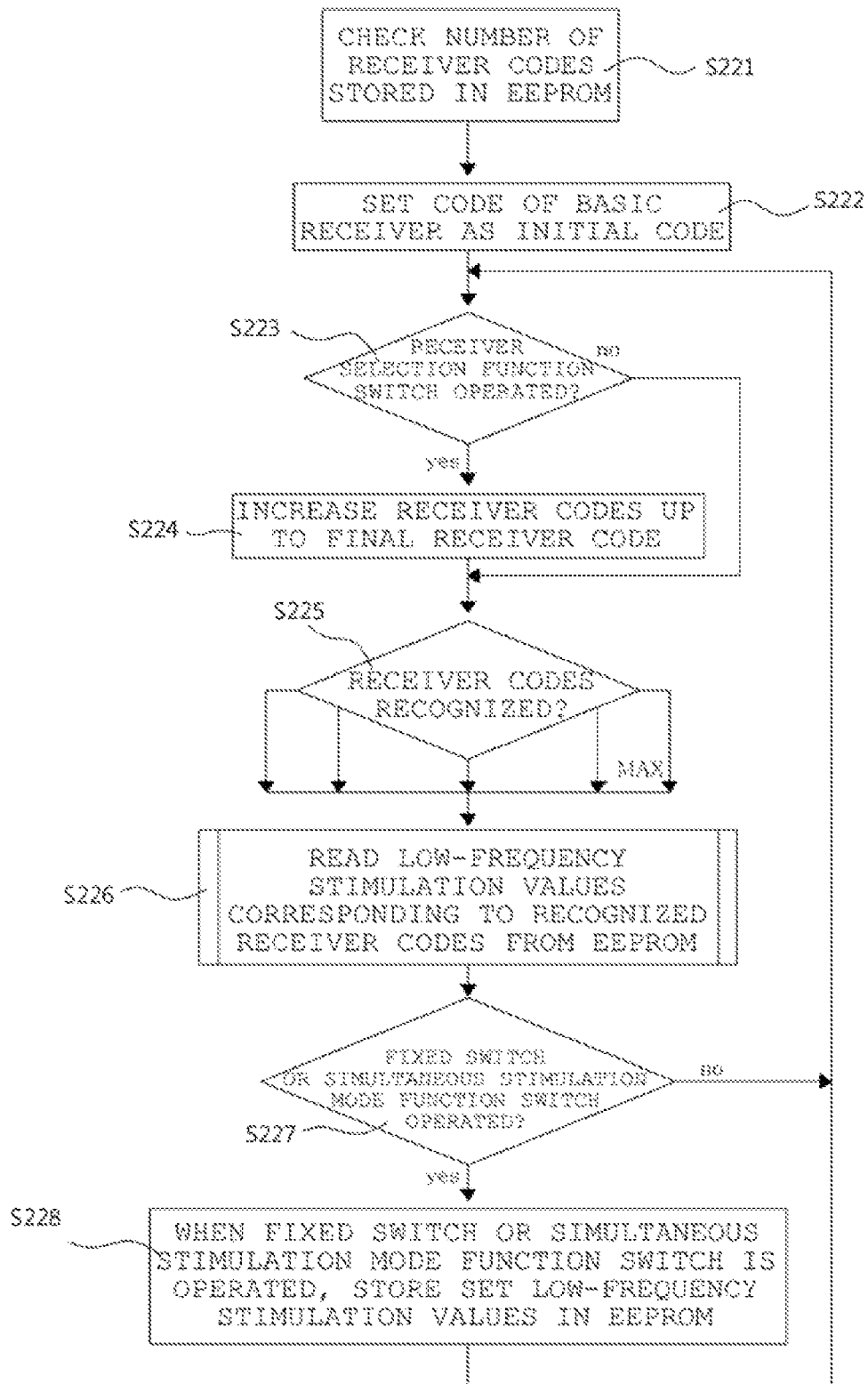

[Figure 10]
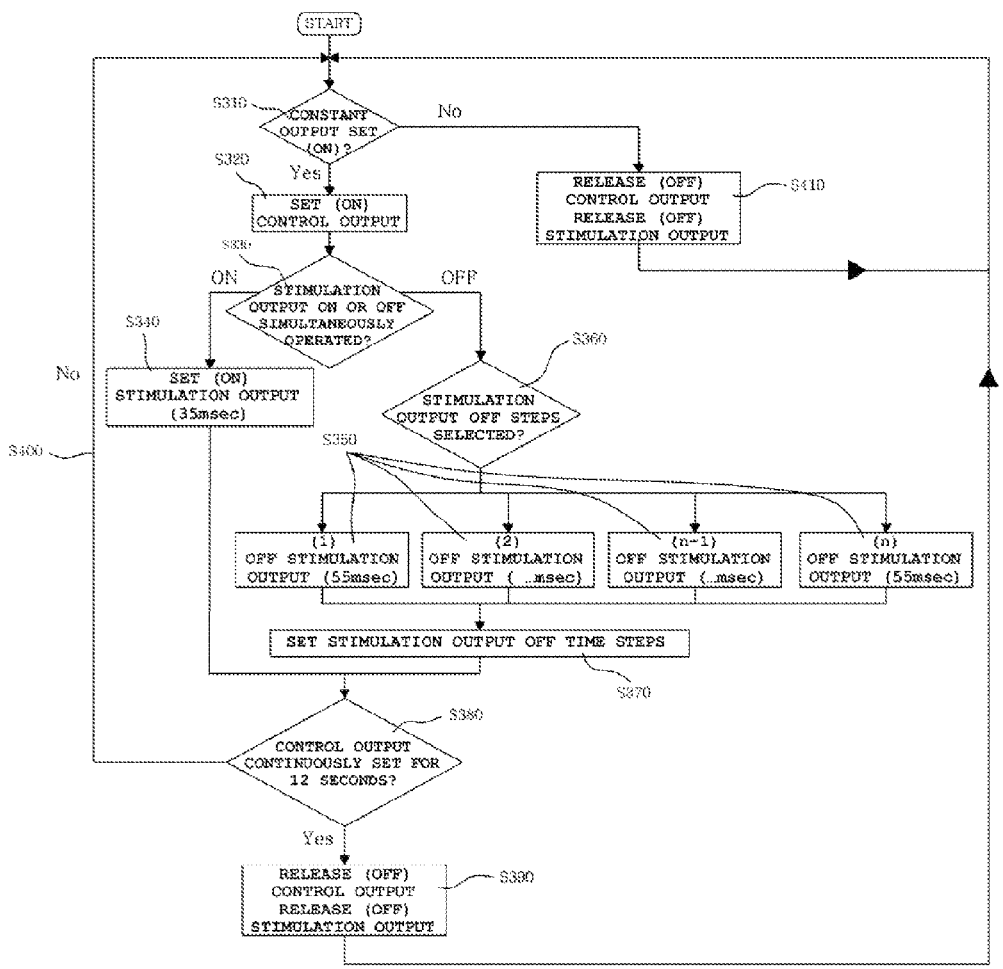

[Figure 11]
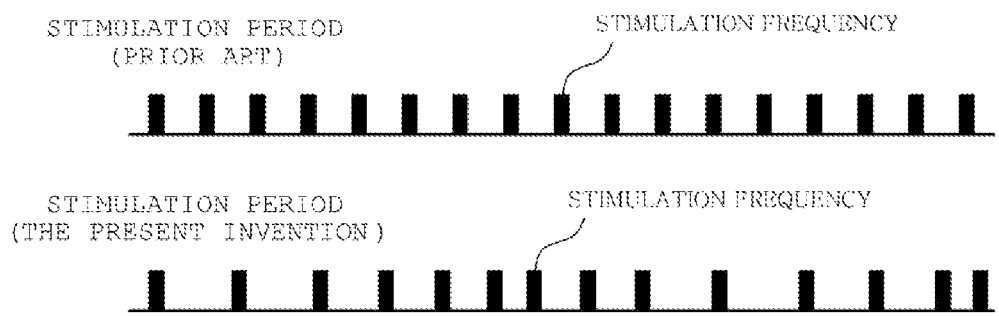

ANIMAL TRAINING DEVICE AND METHOD OF CONTROLLING THE SAME

CROSS-REFERENCES TO RELATED APPLICATION

This patent application claims the benefit of priority under 35 U.S.C. §119 from Korean Patent Application Nos. 10-2009-0101121 filed on Oct. 23, 2009 and 10-2009-0101125 filed on Oct. 23, 2009, the contents of which are incorporated herein by reference.

BACKGROUND OF THE INVENTION

1. Field of the Invention

The present invention relates, in general, to an animal training device and method of controlling the device, and, more particularly, to an animal training device and method of controlling the device, which set stimulation intensities suitable for respective animals to control a plurality of animals, and have an emergency stimulation function of applying a predetermined additional stimulation to each animal and a simultaneous stimulation function of applying stimulations to a plurality of animals to simultaneously control the plurality of animals, and which especially set a stimulation level suitable for a specific animal and automatically vary the period of the stimulation, thus efficiently controlling animals.

2. Description of the Related Art

Generally, animal training devices are worn on the neck or any other part of the body of an animal and are configured to train the animal by applying an electric shock thereto.

Such a conventional animal training device includes a transmitter 110 and a receiver 100, as shown in FIG. 1.

The transmitter 110 transmits a Radio Frequency (RF) signal 112 to the receiver 100 to apply an electrical stimulation to an animal according to the manipulation of a trainer who is training the animal. The transmitter 110 includes a stimulation adjusting controller 114, a power switch 116 and a transmitting antenna 118. The stimulation adjusting controller 114 sets the stimulation level of the electric shock to be output from the receiver 100. The power switch 116 is adapted to control the transmission of the RF signal 112 with the level set by the stimulation adjusting controller 114. The transmitting antenna 118 transmits the RF signal containing the level indication information of a shock wave and indication code (hereinafter referred to as 'ID code') information for determining a relevant receiver according to the conditions set by the stimulation adjusting controller 114.

The receiver 100 receives the RF signal 112 transmitted from the transmitter 110 through the transmitting antenna 118, and generates the shock wave, set by the stimulation adjusting controller 114, for a predetermined period of time. For this operation, the receiver 100 includes a receiving antenna 125, and a receiver unit 130. The receiving antenna 125 receives the RF signal transmitted from the transmitter 110 through the transmitting antenna 118. The receiver unit 130 amplifies and detects the RF signal received by the receiving antenna 125.

The receiver unit 130 includes a detection means, a receiving microprocessor, an amplification means, a shock wave generation means, and a pair of electrodes 132. The detection means receives the RF signal through the receiving antenna 125 and demodulates the RF signal into the shock wave with the level set by the stimulation adjusting controller 114 of the transmitter 110. The receiving microprocessor determines whether the demodulated signal output from the detection means is identical to a signal transmitted by the trainer, and outputs a shock wave control signal with the level set by the stimulation adjusting controller 114 of the transmitter if it is determined that the signals are identical to each other. The amplification means is switched in response to the shock wave control signal output from the receiving microprocessor and is configured to amplify the demodulated signal to a predetermined level. The shock wave generation means generates a high voltage shock wave according to the switching and amplification performed by the amplification means. The pair of electrodes 132 output the shock wave generated by the shock wave generation means. In detail, in order for the shock wave to be applied from the receiver unit 130 to the animal, the electrodes 132 are fixedly mounted to the receiver unit 130 such that they penetrate a collar 120 and project toward the neck of the animal.

However, the conventional animal training device is problematic in that a single transmitter and a single receiver must be used for each animal and a user must personally set the stimulation level required to control the animal, thus deteriorating the efficiency of animal training and making it difficult to simultaneously control a plurality of animals in an emergency situation.

Further, such a conventional animal training device is problematic in that, since the period of stimulation applied to an animal is uniform regardless of the level (intensity) of stimulation, the stimulation may apply stress to the animal, and a threshold phenomenon occurs when training is continuously conducted, thus decreasing the efficiency of animal training and making it difficult to control the animal by using the animal training device.

SUMMARY OF THE INVENTION

Accordingly, the present invention has been made keeping in mind the above problems occurring in the prior art, and an object of the present invention is to provide an animal training device and method of controlling the device, which set low-frequency stimulation intensities suitable for respective animals to control a plurality of animals, and have an emergency stimulation function of applying a predetermined additional stimulation to each animal and a simultaneous stimulation function of applying stimulations to a plurality of animals to simultaneously control the animals, and which automatically vary the period of low-frequency stimulation, thus preventing stress from being applied to animals and improving the efficiency of animal training thanks to the prevention of the occurrence of a threshold phenomenon.

In accordance with an aspect of the present invention, there is provided an animal training device, comprising a transmitter configured to transmit Radio Frequency (RF) signals according to manipulation of a plurality of function switches, and provided with an emergency stimulation mode in which an RF control signal is transmitted by adding a predetermined level to a low-frequency stimulation level set for each individual animal, a simultaneous stimulation mode in which an RF control signal is transmitted by adding a predetermined level to low-frequency stimulation levels set for a plurality of animals, and a constant stimulation alternation mode in which an RF control signal is transmitted by automatically varying a period of a low-frequency stimulation set for each animal; and at least one receiver configured to set a low-frequency stimulation for a corresponding one of the plurality of animals in response to the RF signals from the transmitter, and to selectively perform operations corresponding to the emergency stimulation mode, the simultaneous stimulation mode, and the constant stimulation alternation mode.

Preferably, the constant stimulation alternation mode may be implemented such that output setting (ON) and output release (OFF) of a low-frequency stimulation are repeatedly performed, and such that, when output of the stimulation is released (OFF), release (OFF) time is divided into a plurality of (n) time steps having predetermined intervals, and the release time steps are sequentially set.

Preferably, the predetermined intervals may be 55 msec to 125 msec.

Preferably, the transmitter may comprise a plurality of function switches for selecting a relevant receiver worn on a specific animal, applying a temporary or constant stimulation, and selecting a function of the emergency stimulation mode or the simultaneous stimulation mode, and a function of the constant stimulation alternation mode; power control means for supplying power from a battery to individual parts of the transmitter or interrupting supply of the power by applying pressure for a predetermined period of time; ID code setting means for assigning and setting an indication (ID) code to define basic items required for communication with at least one receiver; a transmitting microprocessor for storing a low-frequency stimulation value set for the receiver, the ID code of which has been set, and a function selected for the receiver in Electrically Erasable Programmable Read Only Memory (EEPROM), and outputting control signals to enable functions set by the plurality of function switches to be performed; a Liquid Crystal Display (LCD) panel for displaying the low-frequency stimulation value and the function, which are set in response to the control signals from the transmitting microprocessor, on a screen; oscillation/modulation means for oscillating and modulating both the ID code and the control signals generated by the transmitting microprocessor into RF signals; a low pass filter for cutting off high frequency components from the RF signals output from the oscillation/modulation means; and a transmitting antenna for radiating signals output from the low pass filter to a space.

Preferably, the plurality of function switches may comprise a low-frequency stimulation control function switch implemented as an encoder switch and configured to subdivide and set low-frequency stimulation levels for respective animals; a temporary stimulation function switch configured to set low-frequency stimulation levels so that a selected receiver instantaneously applies a low-frequency stimulation regardless of an operating time; a constant stimulation alternation mode function switch configured such that the selected receiver applies a low-frequency stimulation by automatically varying a stimulation period for an operating time of the selected receiver; a sound control function switch configured to perform control such that an auditory stimulation is output to a corresponding animal in a form of a high-tone melody sound or low-tone warning sound; an emergency stimulation mode function switch configured to transmit an RF control signal by adding a predetermined stimulation value to a stimulation value set for each animal; a simultaneous stimulation mode function switch configured to transmit an RF control signal by adding a predetermined stimulation value to stimulation values respectively set for a plurality of animals; a flash control function switch configured to control an ON/OFF operation of a lighting device of the receiver while being pressed for a predetermined period of time; and a receiver selection function switch configured to select any one from among a plurality of receivers worn on the animals.

Preferably, when the simultaneous stimulation mode function switch is operated, a stimulation value, obtained by controlling the low-frequency stimulation control function switch, may be added to or subtracted from simultaneous stimulation values set for the plurality of animals, and thus resulting simultaneous stimulations may be applied to the animals. The oscillation/modulation means may be implemented as a Voltage Controlled Crystal Oscillator (VCXO) for simultaneously performing RF oscillation and modulation.

Preferably, the receiver may comprise power control means operated for a predetermined period of time and configured to supply power from a battery to individual parts of the receiver or interrupt supply of the power; a receiving antenna configured to receive RF signals from the transmitter; an RF amplification unit configured to amplify the RF signals received by the receiving antenna; a mixer unit configured to generate Intermediate Frequency (IF) signals using both the RF signals provided by the RF amplification unit and an oscillation signal provided by separately provided oscillation means; filter means configured to filter out noise from the IF signals generated by the mixer unit; detection means configured to detect the control signals and the ID code of the transmitter from the signals output from the filter means; a receiver microprocessor module configured to perform control such that a relevant low-frequency stimulation is output in response to each received control signal; low-frequency stimulation generation means configured to output the low-frequency stimulation to a corresponding animal through a stimulation terminal; and flash driving means configured to control temperature and illuminance of a lighting device in response to a control signal generated by an operation of a flash control function switch of the transmitter, and implemented using a constant current scheme.

Preferably, the receiver microprocessor module may comprise amplification means for amplifying analog signals detected by the detection means; receiver conversion means for converting the signals amplified by the receiver amplification means into digital signals; reference voltage supply means for supplying constant voltage so that the receiver amplification means and the receiver conversion means can be operated; a microprocessor for outputting a control signal to a relevant low-frequency stimulation when a preset ID is identical to the received ID code; Digital to Analog (D/A) converter means for converting the digital signals into analog signals and outputting the analog signals; and reset means for resetting the microprocessor when supplied voltage becomes less than the constant voltage.

Preferably, the low-frequency stimulation generation means may be high-voltage stimulation generation means implemented as a transformer.

In accordance with another aspect of the present invention, there is provided a method of controlling an animal training device, comprising the steps of a) searching Electrically Erasable Programmable Read Only Memory (EEPROM), in which low-frequency stimulation intensities set for receivers, ID codes of which have been set, and functions selected for the receivers are stored, for receivers worn on a plurality of animals; b) determining whether a flash control function switch for the receivers found at step a) is operated; c) if it is determined at step b) that the flash control function switch is not operated, determining whether a receiver selection function switch is operated, and then additionally storing a number of receivers worn on the animals; d) storing a receiver newly set at step c) in the EEPROM; e) determining whether an emergency stimulation mode function switch is operated; f) if it is determined at step e) that the emergency stimulation mode function switch is operated, adding a specific value to a current low-frequency stimulation value set for each receiver, and then outputting a resulting low-frequency stimulation; g) if it is determined at step e) that the emergency stimulation mode function switch is not operated, determining whether a fixed switch is operated; h) if it is determined at step g) that the fixed switch is not operated, determining whether a simultaneous stimulation mode function switch is operated; i) if it is determined at step g) that the fixed switch is operated, and if it is determined at step h) that the simultaneous stimulation mode function switch is operated, storing current low-frequency stimulation values in the EEPROM; and j) outputting the current low-frequency stimulation values set for the animals at step i).

Preferably, the method may further comprise the step of k), if it is determined at step b) that the flash control function switch is operated, operating a lighting device of each receiver, the step k) comprising the steps of k1) determining whether the flash control function switch of the transmitter is operated; k2) if it is determined at step k1) that the flash control function switch is operated, determining whether the lighting device of the receiver has been turned on or off; k3) if it is determined at step k2) that the lighting device of the receiver has been turned off, turning on the lighting device of the receiver; k4) if it is determined at step k2) that the lighting device of the receiver has been turned on, determining whether a low-frequency stimulation control function switch is operated; k5) if it is determined at step k4) that the low-frequency stimulation control function switch is not operated, turning off the lighting device of the set receiver; k6) if it is determined at step k4) that the low-frequency stimulation control function switch is operated, determining whether the flash control function switch is operated for five or more seconds; k7) if it is determined at step k6) that the flash control function switch is not operated for five or more seconds, controlling an ON/OFF period of the lighting device of the receiver; k8) if it is determined at step k6) that the flash control function switch is operated for five or more seconds, controlling brightness of the lighting device of the receiver; k9) if it is determined at step k1) that the flash control function switch is not operated, performing steps k3), k5), k7), and k8), and thereafter returning to an initial state.

Preferably, step i) of, if it is determined at step g) that the fixed switch is operated and if it is determined at step h) that the simultaneous stimulation mode function switch is operated, storing current low-frequency stimulation values in the EEPROM, may comprise the steps of i1) determining a number of codes of receivers stored in the EEPROM; i2) setting a code of a receiver, worn on a single specific animal when power of the animal training device has been turned on, as an initial code; i3) determining whether the receiver selection function switch is operated; i4) if it is determined at step i3) that the receiver selection function switch is operated, changing receiver codes while increasing and going up to a code of a final receiver; i5) recognizing codes of the receivers set by the receiver selection function switch at step i4); i6) reading low-frequency stimulation values corresponding to the receiver codes recognized at step i5) from the EEPROM; i7) determining whether a user operates the fixed switch or the simultaneous stimulation mode function switch; and i8) if it is determined at step i7) that the fixed switch or the simultaneous stimulation mode function switch is operated, storing set low-frequency stimulation values in the EEPROM as current low-frequency stimulation values, wherein if it is determined at step i7) that the fixed switch or the simultaneous stimulation mode function switch is not operated, or after step i8), the process returns to step i3).

In accordance with a further aspect of the present invention, there is provided a method of controlling an animal training device, comprising the steps of a) performing constant output setting so that a transmitter and at least one receiver for receiving Radio Frequency (RF) signals are operated by controlling a constant stimulation alternation mode function switch of the transmitter; b) performing control output setting so that, when constant output is set (ON) at step a), the receiver prepares for outputting a low-frequency stimulation; c) after control output has been set at step b), repeatedly operating setting (ON) and release (OFF) of stimulation output set for the receiver to apply a stimulation to animals; d) determining whether a constant operating time for control output has exceeded a predetermined time; e) if it is determined at step d) that the constant operating time has exceeded the predetermined time, releasing (OFF) the control output and releasing (OFF) the stimulation output, whereas if it is determined at step d) that the constant operating time has not exceeded the predetermined time, returning to step a); and f) when constant output is not set (OFF) at step a), returning to step a) without setting (OFF) control output and stimulation output so that the receiver is not operated.

Preferably, step c) may comprise c1) if it is determined that the stimulation output is set (ON), the receiver outputting a low-frequency stimulation at a period of 30 msec to 40 msec; and c2) if it is determined that the stimulation output is released (OFF), dividing a release (OFF) time for the stimulation output into a plurality of (n) time steps having predetermined intervals ranging from 55 msec to 125 msec, and selecting and sequentially setting the release time steps.

Preferably, wherein step c2) may be configured such that, when the release (OFF) time for the stimulation output includes a plurality of (n) time steps, the time steps sequentially increase from a minimum value to a maximum value (for example, 1=55 msec, 2=, ..., n=125 msec), and sequentially decreases from the maximum value to the minimum value (n=125 msec, n−1=, ..., 2=, 1=55 msec) when the time steps reach the maximum value. Further, the constant operating time for the control output may be 12 seconds.

Accordingly, the animal training device and method of controlling the device according to the present invention are advantageous in that they can set stimulation intensities suitable for respective animals so as to easily control a plurality of animals, can have an emergency stimulation function of applying a predetermined additional stimulation to each animal and a simultaneous stimulation function of applying stimulations to a plurality of animals to simultaneously control the animals, can easily set various low-frequency stimulation intensities using an encoder switch, and can use auditory signals such as a warning sound or a melody sound to train animals.

Further, the present invention is advantageous in that the period of low-frequency stimulation is automatically varied, so that stress is not applied to animals, and the occurrence of a threshold phenomenon is prevented, thus improving the efficiency of animal training.

BRIEF DESCRIPTION OF THE DRAWINGS

FIG. 1 is a schematic diagram showing a conventional animal training device including a transmitter and a receiver;

FIGS. 2A to 2C are schematic diagrams showing the transmitter of an animal training device according to an embodiment of the present invention;

FIGS. 3A to 3C are schematic diagrams showing the receiver of an animal training device according to an embodiment of the present invention;

FIG. 4 is a block diagram showing the transmitter of FIGS. 2A to 2C;

FIG. 5 is a block diagram showing the receiver of FIGS. 3A to 3C;

FIG. 6 is a block diagram schematically showing the receiver microprocessor module of FIG. 5;

FIG. 7 is a flowchart showing a method of controlling the animal training device according to the present invention;

FIG. 8 is a flowchart showing the operating control of a lighting device in the method of controlling the animal training device according to the present invention;

FIG. 9 is a flowchart showing the control of low-frequency stimulation values for respective animals in the method of controlling the animal training device according to the present invention;

FIG. 10 is a flowchart showing another method of controlling the animal training device according to the present invention; and FIG. 11 is a graph showing variation in the period of a low-frequency stimulation generated by the method of FIG. 10.

DESCRIPTION OF THE PREFERRED EMBODIMENTS

The above and other objects, features and advantages of the present invention will be more clearly understood from the following detailed description taken in conjunction with the accompanying drawings. Hereinafter, embodiments of an animal training device according to the present invention will be described in detail with reference to the attached drawings.

In the present invention, the term 'low-frequency stimulation value' and the term 'low-frequency stimulation level' are considered to be identical. Terms, not especially defined in the present specification, are terms well-known to those skilled in the art and are defined according to common knowledge.

FIGS. 2A to 2C are schematic diagrams showing the transmitter 200 of an animal training device according to an embodiment of the present invention, FIGS. 3A to 3C are schematic diagrams showing the receiver 300 of the animal training device according to an embodiment of the present invention, FIG. 4 is a block diagram showing the transmitter 200 of FIGS. 2A to 2C, FIG. 5 is a block diagram showing the receiver 300 of FIGS. 3A to 3C, and FIG. 6 is a block diagram schematically showing the receiver microprocessor module 350 of FIG. 5.

The animal training device of the present invention shown in the drawings includes the transmitter 200 and at least one receiver 300. The transmitter 200 transmits RF signals according to the manipulation of a plurality of function switches 210, and is provided with an emergency stimulation mode, a simultaneous stimulation mode, and a constant stimulation alternation mode. The emergency stimulation mode is a mode in which an RF control signal is transmitted by adding a predetermined level to a low-frequency stimulation level set for each animal. The simultaneous stimulation mode is a mode in which an RF control signal is transmitted by adding a predetermined level to low-frequency stimulation levels set for a plurality of animals. The constant stimulation alternation mode is a mode in which an RF control signal is transmitted by automatically varying the period of low-frequency stimulation set for each animal. The receiver 300 sets a low-frequency stimulation signal for a corresponding one of a plurality of animals in response to the RF signals from the transmitter 200, and selectively performs operations corresponding to the emergency stimulation mode, simultaneous stimulation mode and constant stimulation alternation mode.

The transmitter 200 of the animal training device will be described in detail with reference to FIGS. 2 to 6. The transmitter 200 includes a plurality of function switches 210, a power control means 220, an ID code setting means 230, a transmitting microprocessor 240, a Liquid Crystal Display (LCD) panel 250, an oscillation/modulation means 260, a low pass filter 270, and a transmitting antenna 280.

The plurality of function switches 210 are components for selecting the receiver 300 worn on a specific animal, applying a temporary or constant stimulation to the animal, and selecting the function of the emergency stimulation mode or simultaneous stimulation mode and the function of the constant stimulation alternation mode in which the period of a low-frequency stimulation is automatically varied to apply the stimulation. In detail, the function switches 210 may include a low-frequency stimulation control function switch 211 for subdividing and setting low-frequency stimulation levels for respective animals using an encoder switch, a temporary stimulation function switch 212 for setting a low-frequency stimulation value so that the selected receiver 300 instantaneously applies a low-frequency stimulation regardless of operating time, a constant stimulation alternation mode function switch 213 for functioning to allow the selected receiver 300 to apply a stimulation by automatically varying the period of a low-frequency stimulation for the operating time, a sound control function switch 214 for performing control such that the selected receiver 300 outputs an auditory stimulation in the form of a high-tone melody sound or a low-tone warning sound to a corresponding animal, an emergency stimulation mode function switch 215 for functioning to transmit an RF control signal by adding a predetermined stimulation value to a stimulation value set for each animal, a simultaneous stimulation mode function switch 216 for functioning to transmit an RF control signal by adding a predetermined stimulation value to stimulation values set for a plurality of animals, a flash control function switch 217 for controlling the ON/OFF operation of the lighting device 375 of the receiver 300 while being pressed for a predetermined period of time, and a receiver selection function switch 218 for enabling any one of a plurality of receivers 300 worn on the animals to be selected.

In the animal training device according to the present invention, the low-frequency stimulation control function switch 211 among the function switches 210 is implemented using an encoder switch scheme. When a selector switch, which is a conventional mechanical switch, is used, low-frequency stimulation values cannot be subdivided, and levels suitable for respective animals cannot be set when a plurality of receivers are used. In contrast, the encoder switch of the present invention is advantageous in that, since it can be rotated by an angle of 360°, low-frequency stimulation values not only can be subdivided, but also can be continuously set, and in that, when a plurality of receivers are used, levels suitable for respective animals can be set.

The receiver selection function switch 218 is a multi-selection switch required to allow the single transmitter 200 to simultaneously control a plurality of receivers 300, and is configured to select corresponding animals whenever the receiver selection function switch 218 is pressed when the number of receivers 300 is set in advance. The receiver selection function switch 218 functions to select animals. Whenever this switch is operated, corresponding animals are individually displayed or all animals are simultaneously displayed on the LCD panel 250. When corresponding animals are individually displayed, numbers corresponding to stimulation levels set for the animals are displayed on the LCD panel 250. Further, when all animals are displayed, a word "ALL", instead of stimulation level numbers, is displayed. Furthermore, when the receiver selection function switch 218 is pressed and released within five seconds, the function of switching animals is performed. When the receiver selection function switch 218 is pressed for five or more seconds, the current mode is switched to an animal setting mode, so that relevant animals can be set by adding or subtracting the level of the low frequency stimulation control function switch 211.

When the temporary stimulation function switch 212 is operated, the receiver 300 outputs three short low-frequency stimulation pulses regardless of operating time. When the constant stimulation alternation mode function switch 213 is operated, the receiver 300 continuously outputs a low-frequency stimulation for an operating time (for a maximum of 12 seconds). In this case, when the low-frequency stimulation control function switch 211 is controlled while the constant stimulation alternation mode function switch 213 is operated, a controlled stimulation level is added to or subtracted from the stimulation level set for each animal, and a resulting stimulation is applied to the animal.

Further, when the sound control function switch 214 is operated, the receiver 300 may output a melody sound such as "do, mi, sol, do, mi" and then praise each animal, regardless of the operating time, or may give a strong whistle like "goof" according to the setting of the functions by the transmitter 200 and then realize an effect of calling an animal located far away from an owner using the whistle rather than a stimulation.

A lighting device 292 separately provided in the transmitter 200 functions as a flashlamp. The lighting device 375 of the receiver 300 controlled by the flash control function switch 217 functions to detect the location of a relevant animal. In the present invention, when the flash control function switch 217 of the transmitter 200 is pressed for five seconds or less, the level of the low-frequency stimulation control function switch 211 is added or subtracted, so that the ON/OFF period of the lighting device 375 of the receiver 300 can be controlled. When the flash control function switch 27 is pressed for five or more seconds, the level of the low-frequency stimulation control function switch 211 is added or subtracted, so that the brightness of the lighting device 375 of the receiver 300 can be controlled.

In particular, when the level of the low-frequency stimulation control function switch 211 is added or subtracted while the flash control function switch 217 of the transmitter 200 is pressed for five seconds or less, the ON/OFF period of the lighting device 375 of the receiver 300 can be set to one selected from among 1, 1.5, 2, 2.5, 3, 3.5, and 4 seconds. In this case, 10 S, 15 S, 20 S, 25 S, 30 S, 35 S and 40 S are displayed on the LCD panel 250.

Further, when the flash control function switch 217 of the transmitter 200 is pressed for five or more seconds, and a flash symbol on the LCD panel 250 blinks, the level of the low-frequency stimulation control function switch 211 which is of an encoder switch type is added or subtracted, and thus the brightness is set to a suitable step selected from among first step, second step, and third step. In this case, L1, L2 and L3 are displayed on the LCD panel 250.

In this case, the low-frequency stimulation control function switch 211 which is of an encoder switch type may perform a low-frequency stimulation control function, a brightness control function, and a receiver selection function.

The emergency stimulation mode function switch 215 and the simultaneous stimulation mode function switch 216 are provided to prepare for an emergency or urgent situation in which an animal injures a human being or animals fight with each other. When the emergency stimulation mode function switch 215 is operated, the transmitter 200 is applied to each individual animal. That is, the transmitter 200 transmits an RF control signal by adding a predetermined stimulation value to a preset stimulation value. A corresponding receiver 300 receives the control signal, and applies a relevant low-frequency stimulation to a corresponding animal through the stimulation terminals 365 of the receiver 300. When the simultaneous stimulation mode function switch 216 is operated, the transmitter 200 is applied to a plurality of animals. That is, the transmitter 200 transmits an RF control by adding a predetermined stimulation value to preset stimulation values. Respective receivers 300 receive the control signal, and then apply low-frequency stimulations to the plurality of animals through the stimulation terminals 365 of the receivers 300. Furthermore, while the simultaneous stimulation mode function switch 216 is operated, all receivers simultaneously output stimulations, the levels of which are increased from their previous levels by 10 levels, to the animals. Even in this case, when the animals do not obey the commands, a stimulation level is simultaneously added to or subtracted from the current stimulation levels and then resulting stimulations are applied to the animals if the encoder switch-type low-frequency stimulation control function switch 211 is turned to the left or right.

The function switches other than the low-frequency stimulation control function switch 211 may be implemented to be of an electronic one-touch type or a button type. Further, although not included in the description of the function switches 210, a fixed switch (not shown) functioning to allow the low-frequency stimulation values currently set for the receivers 300 to be stored in Electrically Erasable Programmable Read Only Memory (EEPROM) may be provided.

The power control means 220 is configured to supply power from a battery 224 to individual parts of the transmitter 200 or interrupt the supply of the power by applying pressure for a predetermined period of time. The battery 224 is charged by a separately provided charging means 222, which may use electricity, solar heat, etc. The transmitter 200 of the present invention may be operated such that, when the power control means 220 is pressed for 0.5 or more seconds, the transmitter 200 is turned on, and such that, when the power control means 220 is pressed again for one or more seconds after the transmitter 200 has been turned on, the transmitter is turned off.

The ID code setting means 230 is a unit for assigning and setting ID codes to define basic items required for communication with receivers 300, and assigns product functions and ID codes to the receivers 300. The number of codes can be designated according to the user's requirements. When a procedure for setting the codes using the ID code setting means 230 of the transmitter 200, and pairing a corresponding receiver 300 and the transmitter 200 while turning on the power of the receiver 300, is performed, the transmitter 200 and the receiver 300 form a single set.

The transmitting microprocessor 240 functions to store both the low-frequency stimulation values set for the receivers 300, the ID codes of which have been set, and the functions selected for the receivers 300, in the EEPROM, and to output control signals so that functions set by the plurality of function switches are performed. Further, the transmitting microprocessor 240 outputs all functions and ID code signals input from the function switches 210, and may also be provided with an ON/OFF switch function. Furthermore, the transmitting microprocessor 240 controls the LCD panel 250 and a flash driving means 290, and also controls the oscillation/modulation means 260, an RF amplification means 265, and an RF output means 267 when relevant functions are activated.

The LCD panel 250 displays low-frequency stimulation values and functions set in response to the control signals output from the transmitting microprocessor 240 on a screen.

In detail, low-frequency stimulation values set by the low-frequency stimulation control function switch 211, flash pictures set by the flash control function switch 217, and codes of the receivers worn on animals by the receiver selection function switch 218, and the amount of charge remaining in the battery 224 are displayed.

The oscillation/modulation means 260, which is configured to oscillate and modulate the ID codes and the control signals generated by the transmitting microprocessor 240 into RF signals, can simultaneously perform RF oscillation and modulation using a Voltage-Controlled Crystal Oscillator (VCXO). Unlike existing oscillators which generate stabilized frequency signals according to an input voltage, VCXO is configured to change the frequency to satisfy allowable specifications in response to changes in input voltage, thus realizing advantages of stabilizing the frequency and also performing stabilized modulation.

The low pass filter (LPF) 270 functions to cut off frequency components, other than fundamental waves, from RF signals which have been output from the oscillation/modulation means 260 and have been generated via the RF amplification means 265 and the RF output means 267. The RF amplification means 265 functions to amplify the RF signals output from the oscillation/modulation means 260 so that a subsequent stage can be operated, because the RF power of the oscillation/modulation means 260 is low. The RF output means 267 functions to amplify the RF signals so that the requirements of the range between the transmitter 200 and each receiver 300 can be satisfied.

The transmitting antenna 280 is configured to radiate the output signals of the low pass filter 270 to the space, and functions to transmit RF signals which are composed of fundamental waves.

Next, the receiver 300 of the animal training device will be described in detail with reference to FIGS. 2 to 6.

The receiver 300 according to the present invention includes a power control means 310, a receiving antenna 315 for receiving signals transmitted from the transmitter 200, an RF amplification unit 320, a mixer unit 330, a filter means 335, a detection means 340, a receiver microprocessor module 350, a low-frequency stimulation generation means 360, and a flash driving means 370.

In detail, the power control means 310 is operated for a predetermined period of time, and is configured to supply power from a battery 312 to individual parts of the receiver 300, or to interrupt the supply of power. In the present invention, when a magnet is brought into contact with a lead switch (not shown) separately provided in the receiver 300 for 0.5 or more seconds, the power of the receiver is turned on. When the magnet is brought into contact with the lead switch again for 0.5 or more seconds in the state in which the power of the receiver is turned on, the power of the receiver is turned off. The battery 312 can be implemented as a Nickel Metal Hydride (NiMH) battery which is a secondary battery. Since the battery 312 is a secondary battery, a separate charging means 313 is required. In this case, 10 or more hours will be required for charging.

The RF amplification unit 320 amplifies the RF signals received by the receiving antenna 315, and amplifies weak RF signals inducted at the receiving antenna 315 in the present invention.

The mixer unit 330 generates Intermediate Frequency (IF) signals which are second frequency signals using both the RF signals provided by the RF amplification unit 320 and an oscillation signal provided by a separately provided oscillation means 325. In this case, an oscillator (OSC) may be used as the oscillation means 325.

The filter means 335 is a means for filtering out noise contained in the IF signals generated by the mixer unit 330, and the detection means 340 is a means for detecting the control signals and ID signals of the transmitter 200 from the signals output from the filter means 335.

The receiver microprocessor module 350 functions to perform control such that a relevant low-frequency stimulation is output in response to a received control signal. The receiver microprocessor module 350 includes a receiver amplification means 351, a receiver conversion means 352, a reference voltage supply means 353, a microprocessor 354, a Digital/Analog (D/A) converter means 355, and a reset means 356. The receiver amplification means 351 amplifies analog signals detected by the detection means 340. The receiver conversion means 352 converts the analog signals amplified by the receiver amplification means 351 into digital signals. The reference voltage supply means 353 supplies constant voltage so that the receiver amplification means 351 and the receiver conversion means 352 can be operated. The microprocessor 354 outputs control signals to output a relevant low-frequency stimulation when a preset ID is identical to a received ID signal. The D/A converter means 355 converts the digital signals into analog signals, and outputs the analog signals. The reset means 356 resets the microprocessor 354 when the supplied voltage becomes less than the constant voltage.

The D/A converter means 355 is connected to the low-frequency stimulation generation means 360 to transfer the analog signals thereto. The microprocessor 354 is connected to a buzzer driving means 380 to be capable of outputting a sound signal such as a melody sound or a warning sound through a separately provided buzzer 385, and is connected to the flash driving means 370 to be capable of operating the lighting device 375.

The low-frequency stimulation generation means 360 outputs low-frequency stimulations through the stimulation terminals 365 so as to apply the low-frequency stimulations to a corresponding animal. In the present invention, a transformer is used as a high-voltage stimulation generation means for applying low-frequency stimulations.

The flash driving means 370 is configured to control the temperature and illuminance of the lighting device 375 in response to a control signal generated by the operation of the flash control function switch 217 of the transmitter 200, and can be implemented using, especially, a constant current scheme. In particular, in the present invention, it is preferable for the brightness of the lighting device 375 to be maximized so that the locations of animals can be easily detected in the dark of night, and that the lighting device 375 be operated for an operating time of 0.1 seconds every four seconds.

An embodiment in which an emergency stimulation mode and a simultaneous stimulation mode are executed using the animal training device of FIGS. 2 to 6 will be described below.

For example, when three dogs are controlled by individually setting low-frequency stimulation values to control three receivers using one transmitter 200, if it is assumed that a stimulation value for a first dog A is set to 35 levels, a stimulation value for a second dog B is set to 50 levels, and a stimulation value for a third dog C is set to 74 levels, and relevant stimulation modes are used, the respective low-frequency stimulation values are stored in the EEPROM of the transmitter 200. When dog A is selected by manipulating the receiver selection function switch 218 of the transmitter 200, 'A' and '35' are displayed on the LCD panel 250. When dog B is selected, 'B' and '50' are displayed on the LCD panel 250. When dog C is selected, 'C' and '74' are displayed on the LCD panel 250. Accordingly, low-frequency stimulation values suitable for the respective dogs can be set. As a result, since a strong stimulation is not applied to a weak dog, the animal training device is safe. Further, since a weak stimulation is not applied to a strong dog, the animal training device can safely train the dogs using suitable stimulations.

When the emergency stimulation mode function switch 215 is operated, the receiver is operated for one dog in the state in which one receiver is set, and is configured such that the dog can be controlled in an emergency by applying to the dog a low-frequency stimulation to which a predetermined level (for example, 10 levels) is added to the preset stimulation value.

When the simultaneous stimulation mode function switch 216 is operated, dogs can be simultaneously and instantaneously controlled in an emergency (a state in which the dogs have wandered off far away while doing mischief, or fight with each other) by applying stimulations to which a specific value, for example, 10 levels, is added to low-frequency stimulation values set for the plurality of dogs. That is, in the above embodiment, when the simultaneous stimulation mode function switch 216 is operated after 35 levels, 50 levels and 74 levels have been respectively set for dog A, dog B, and dog C, low-frequency stimulation values, in which 10 levels are respectively added to the preset stimulation values, are output from the receivers A, B and C. In other words, stimulation values for the dogs are increased by 10 levels in such a way that low-frequency stimulations for dog A, dog B and dog C are increased to levels, 60 levels, and 84 levels, respectively and are then simultaneously output from the corresponding receivers. As a result, the plurality of dogs can be simultaneously controlled. In this case, 'A', 'B', and 'C' are simultaneously displayed on the LCD panel 250. In this way, the inconvenience of changing the selection of the receivers 300 at each time, and setting and controlling stimulation values is eliminated, and all animals can be simultaneously controlled for a very short time.

Further, while the simultaneous stimulation mode function switch 216 is operated, stimulations, the values of which have increased from preset stimulation levels by 10 levels, are output from the three receivers to the three dogs. Even in this case, when dogs do not obey the commands, stimulation values are simultaneously added to or subtracted from respective stimulation values by turning the encoder switch-type low-frequency stimulation control function switch 211 to the left or right, and are simultaneously output to the three dogs. This realizes the effect of punishing the plurality of animals in a group (disciplinary punishment).

An embodiment of the execution of the constant stimulation alternation mode using the animal training device of FIGS. 2 to 6 will be described below.

In the constant stimulation alternation mode, the output setting (ON) and output release (OFF) of the low-frequency stimulation are repeatedly operated. When the stimulation output is released (OFF), release (OFF) time is divided into a plurality of (n) time steps having predetermined intervals. In the present invention, in the case of output setting (ON), low-frequency stimulation is applied at a period of 30 msec to 40 msec. In the case of output release (OFF), the release (OFF) time is divided into a plurality of (n) time steps having predetermined intervals ranging from 55 msec to 125 msec. Inside this range, a specific interval is selected, and low-frequency output is released (OFF) for the specific interval. In this case, the release (OFF) time is divided into respective cases corresponding to n=1 to n=n, and sequentially increases from a minimum value 1 to a maximum value n. When the release (OFF) time reaches the maximum value n, it sequentially decreases to the minimum value 1.

For example, when n=6, the release (OFF) time steps are set to 55 msec(n=1), 69 msec(n=2), 83 msec(n=3), 97 msec (n=4), 111(n=5), and 125 msec(n=6), respectively. When the output of low-frequency stimulation is set (ON) at a period of 35 msec, and is operating, the respective OFF time steps corresponding to n=1 to n=6 are repeatedly applied. The release (OFF) time steps at this time are sequentially applied in the order of n=1 to n=6, and are thereafter sequentially applied in the order of n=6 to n=1. Accordingly, the period of the output of low-frequency stimulation having a specific level generated by the receiver repeatedly increases and decreases (refer to FIG. 8). In this way, the animal training device can pleasantly train animals without causing the animals to undergo any discomfort.

FIG. 7 is a flowchart showing a method of controlling the animal training device according to the present invention, FIG. 8 is a flowchart showing the operating control of the lighting device in the method of controlling the animal training device according to the present invention, and FIG. 9 is a flowchart showing the control of low-frequency stimulation values for respective animals in the method of controlling the animal training device according to the present invention.

The basic method of controlling the animal training device according to the present invention will be described below with reference to FIG. 7. The method of controlling the animal training device includes steps S110 to S230. At step S110, receivers 300 worn on a plurality of animals are searched for in the EEPROM in which low-frequency stimulation intensities set for the receivers 300, the ID codes of which have been set, and functions selected set for the receivers 300, are stored. Whether the flash control function switch 217 for the receivers 300 found at step S110 is operated is determined at step S120. If it is determined at step S120 that the flash control function switch 217 is not operated, whether the receiver selection function switch 218 is operated is determined at step S150, and the number of receivers 300 worn on the animals is additionally stored at step S160. The receiver 300 newly set at step S160 is stored in the EEPROM at step S170. Whether the emergency stimulation mode function switch 215 is operated is determined at step S180. If it is determined at step S180 that the emergency stimulation mode function switch 215 is operated, a specific value is added to a current low-frequency stimulation value set for each receiver 300 and then a resulting low-frequency stimulation is output at step S190. If it is determined at step S180 that the emergency stimulation mode function switch 215 is not operated, whether the fixed switch (not shown) is operated is determined at step S200. If it is determined at step S200 that the fixed switch (not shown) is not operated, whether the simultaneous stimulation mode function switch 216 is operated is determined at step S210. If it is determined at step S200 that the fixed switch (not shown) is operated, and if it is determined at step S210 that the simultaneous stimulation mode function switch 216 is operated, the current low-frequency stimulation values are stored in the EEPROM at step S220. The current low-frequency stimulation values set for the animals at step S220 are output at step S230.

Referring to FIG. 8, the method of controlling the animal training device further includes the step S130 of, if it is determined at step S120 that the flash control function switch 217 is operated, operating the lighting device 375 of each receiver 300. Step S130 may include steps S131 to S140. At step S131, whether the flash control function switch 217 of the transmitter 200 is operated is determined. If it is determined at step S131 that the flash control function switch 217 is operated, whether the lighting device 375 of the receiver 300 has been turned on or off is determined at step S132. If it is determined at step S132 that the lighting device 375 of the receiver 300 has been turned off, the lighting device 375 of the receiver 300 is turned on at step S133. If it is determined at step S132 that the lighting device of the receiver 300 has been turned on, whether the low-frequency stimulation control function switch 211 is operated is determined at step S134. If it is determined at step S134 that the low-frequency stimulation control function switch 211 is not operated, the lighting device 375 of the set receiver 300 is turned off at step S135. Further, if it is determined at step S134 that the low-frequency stimulation control function switch 211 is operated, whether the flash control function switch 217 is operated for five or more seconds is determined at step S136. If it is determined at step S136 that the flash control function switch 217 is not operated for five or more seconds, the ON/OFF period of the lighting device 375 of the receiver 300 is controlled at step S137. If it is determined at step S136 that the flash control function switch 217 is operated for five or more seconds, the brightness of the lighting device 375 of the receiver 300 is controlled at step S138. If it is determined at step S131 that the flash control function switch 217 is not operated, steps S133, S135, S137, and S138 are performed, and thereafter the process returns to the initial step at step S140.

Referring to FIG. 9, the step S220 of, if it is determined at step S200 that the fixed switch (not shown) is operated and if it is determined at step S210 that the simultaneous stimulation mode function switch 216 is operated, storing the current low-frequency stimulation value in the EEPROM, may include steps S221 to S228. At step S221, the number of codes of the receivers 300 stored in the EEPROM is checked. The code of a receiver 300, worn on a single specific animal when the power of the animal training device is turned on, is set to an initial code at step S222. Whether the receiver selection function switch 218 is operated is determined at step S223. If it is determined at step S223 that the receiver selection function switch 218 is operated, the codes of the receivers are changed by increasing and going up to the code of the final receiver at step S224. The receiver codes set by the receiver selection function switch 218 at step S224 are recognized at step S225. Low-frequency stimulation values corresponding to the receiver codes recognized at step S225 are read from the EEPROM at step S226. Whether the user operates the fixed switch (not shown) or the simultaneous stimulation mode function switch 216 is determined at step S227. If it is determined at step S227 that the fixed switch (not shown) or the simultaneous stimulation mode function switch 216 is operated, the low-frequency stimulation values which have been set are stored in the EEPROM as the current low-frequency stimulation values at step S228. If it is determined at step S227 that the fixed switch (not shown) or the simultaneous stimulation mode function switch 216 is not operated, or after step S228, the process returns to step S223.

FIG. 10 is a flowchart showing another method of controlling the animal training device according to the present invention, and FIG. 11 is a graph showing variation in the period of low-frequency stimulation generated by the method of FIG. 10.

A basic method of controlling the animal training device according to the present invention will be described with reference to FIG. 10. The animal training device control method includes steps S310 to S410. At step S310 which is a constant output setting step, the transmitter 200 and the receivers 300 for receiving RF signals are operated by controlling the constant stimulation alternation mode function switch 213 of the transmitter 200. When constant output is set (ON) at step S310, the receivers 300 prepare for outputting low-frequency stimulations at step S320 which is a control output setting step. After control output has been set at step S320, the setting (ON) and release (OFF) of the stimulation output set in the receivers 300 are repeatedly operated to apply stimulations to animals at step S330. Whether the constant operating time for control output has exceeded a predetermined time is determined at step S380. If it is determined at step S380 that the constant operating time has exceeded the predetermined time, the control output is released (OFF) and the stimulation output is released (OFF) at step S390, whereas if it is determined at step S380 that the constant operating time has not exceeded the predetermined time, the process returns to step S310 at step S400. When constant output is not set (OFF) at step S310, control output and stimulation output are not set (OFF) so that the receivers 300 are not operated, and the process returns to step S310 at step S410. The constant operating time for control output is preferably set to 12 seconds.

At each step, the term 'setting of constant output' means the action of pressing the constant stimulation alternation mode function switch 213 on the transmitter 200 and the situation in which each receiver 300 receives an RF signal. The term 'setting of control output' means the state in which the receiver 300 receives the RF signal from the transmitter 200 and is ready to output low-frequency stimulation. Further, the term 'stimulation output' means that the receiver 300 actually outputs low-frequency stimulations.

Step S330 includes steps S340 to S370. When the stimulation output is set (ON), the receiver 300 outputs low-frequency stimulation at a period of 30 msec to 40 msec at step S340. When stimulation output is released (OFF), the release time for stimulation output is divided into a plurality of (n) time steps having predetermined intervals ranging from 55 msec to 125 msec at step S350. The release (OFF) time steps for stimulation output are selected at step S360, and are sequentially set at step S370.

At step S370, when the number of release (OFF) time steps for stimulation output is plural (n), the animal training device is operated such that the release time steps to be applied sequentially increase from a minimum value to a maximum value (for example, 1=55 msec, 2=, . . . , n=125 msec), and such that, when the release time steps reach the maximum value, they sequentially decrease from the maximum value to the minimum value (for example, n=125 msec, n−1=, . . . , 2=, 1=55 msec) (refer to FIG. 11).

For example, when n is 6, respective release (OFF) time steps are set to 55 msec (n=1), 69 msec (n=2), 83 msec (n=3), 97 msec (n=4), 111 msec (n=5), and 125 msec (n=6). When the output of low-frequency stimulation is set (ON) at a period of 35 msec, and is then activated, respective release (OFF) time steps from n=1 to n=6 are applied together. At this time, release time steps ranging from n=1 to n=6 are sequentially applied, and thereafter release time steps ranging from n=6 to n=1 are sequentially applied. Accordingly, the period at which a low-frequency stimulation having a predetermined level generated by the receiver is output repeatedly increases and decreases. Thereafter, when the constant operating time for the low-frequency stimulation reaches 12 seconds, the generation of stimulation by the receiver 300 is stopped (refer to FIG. 11).

As described above, the animal training device and method of controlling the device according to the present invention are advantageous in that they can set stimulation intensities suitable for respective animals so as to easily control a plurality of animals, can have an emergency stimulation function of applying a predetermined additional stimulation to each animal and a simultaneous stimulation function of applying stimulations to a plurality of animals to simultaneously control the animals, can easily set various low-frequency stimulation intensities using an encoder switch, and can use auditory signals such as a warning sound or a melody sound to train animals.

Further, the present invention is advantageous in that the period of low-frequency stimulation is automatically varied, so that stress is not applied to animals, and the occurrence of a threshold phenomenon is prevented, thus improving the efficiency of animal training.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Those modifications, additions and substitutions, and equivalents thereof should be interpreted as being included in the scope of the present invention.

What is claimed is:

1. A method of controlling an animal training device, comprising the steps of:
   a) searching Electrically Erasable Programmable Read Only Memory (EEPROM), in which low-frequency stimulation intensities set for receivers, ID codes of which have been set, and functions selected for the receivers are stored, for receivers worn on a plurality of animals;
   b) determining whether a flash control function switch for the receivers found at step a) is operated;
   c) if it is determined at step b) that the flash control function switch is not operated, determining whether a receiver selection function switch is operated, and then additionally storing a number of receivers worn on the animals;
   d) storing a receiver newly set at step c) in the EEPROM;
   e) determining whether an emergency stimulation mode function switch is operated;
   f) if it is determined at step e) that the emergency stimulation mode function switch is operated, adding a specific value to a current low-frequency stimulation value set for each receiver, and then outputting a resulting low-frequency stimulation;
   g) if it is determined at step e) that the emergency stimulation mode function switch is not operated, determining whether a fixed switch is operated;
   h) if it is determined at step g) that the fixed switch is not operated, determining whether a simultaneous stimulation mode function switch is operated;
   i) if it is determined at step g) that the fixed switch is operated, and if it is determined at step h) that the simultaneous stimulation mode function switch is operated, storing current low-frequency stimulation values in the EEPROM; and
   j) outputting the current low-frequency stimulation values set for the animals at step i).

2. The method according to claim 1, further comprising the step of k), if it is determined at step b) that the flash control function switch is operated, operating a lighting device of each receiver, the step k) comprising the steps of:
   k1) determining whether the flash control function switch of the transmitter is operated;
   k2) if it is determined at step k1) that the flash control function switch is operated, determining whether the lighting device of the receiver has been turned on or off;
   k3) if it is determined at step k2) that the lighting device of the receiver has been turned off, turning on the lighting device of the receiver;
   k4) if it is determined at step k2) that the lighting device of the receiver has been turned on, determining whether a low-frequency stimulation control function switch is operated;
   k5) if it is determined at step k4) that the low-frequency stimulation control function switch is not operated, turning off the lighting device of the set receiver;
   k6) if it is determined at step k4) that the low-frequency stimulation control function switch is operated, determining whether the flash control function switch is operated for five or more seconds;
   k7) if it is determined at step k6) that the flash control function switch is not operated for five or more seconds, controlling an ON/OFF period of the lighting device of the receiver;
   k8) if it is determined at step k6) that the flash control function switch is operated for five or more seconds, controlling brightness of the lighting device of the receiver;
   k9) if it is determined at step k1) that the flash control function switch is not operated, performing steps k3), k5), k7), and k8), and thereafter returning to an initial state.

3. The method according to claim 1, wherein step i) of, if it is determined at step g) that the fixed switch is operated and if it is determined at step h) that the simultaneous stimulation mode function switch is operated, storing current low-frequency stimulation values in the EEPROM, comprises the steps of:
   i1) determining a number of codes of receivers stored in the EEPROM;
   i2) setting a code of a receiver, worn on a single specific animal when power of the animal training device has been turned on, as an initial code;
   i3) determining whether the receiver selection function switch is operated;
   i4) if it is determined at step i3) that the receiver selection function switch is operated, changing receiver codes while increasing and going up to a code of a final receiver;
   i5) recognizing codes of the receivers set by the receiver selection function switch at step i4);
   i6) reading low-frequency stimulation values corresponding to the receiver codes recognized at step i5) from the EEPROM;
   i7) determining whether a user operates the fixed switch or the simultaneous stimulation mode function switch; and
   i8) if it is determined at step i7) that the fixed switch or the simultaneous stimulation mode function switch is operated, storing set low-frequency stimulation values in the EEPROM as current low-frequency stimulation values,
   wherein if it is determined at step i7) that the fixed switch or the simultaneous stimulation mode function switch is not operated, or after step i8), the process returns to step i3).

4. A method of controlling an animal training device, comprising the steps of:
   a) performing constant output setting so that a transmitter and at least one receiver for receiving Radio Frequency (RF) signals are operated by controlling a constant stimulation alternation mode function switch of the transmitter;

b) performing control output setting so that, when constant output is set (ON) at step a), the receiver prepares for outputting a low-frequency stimulation;

c) after control output has been set at step b), repeatedly operating setting (ON) and release (OFF) of stimulation output set for the receiver to apply a stimulation to animals;

d) determining whether a constant operating time for control output has exceeded a predetermined time;

e) if it is determined at step d) that the constant operating time has exceeded the predetermined time, releasing (OFF) the control output and releasing (OFF) the stimulation output, whereas if it is determined at step d) that the constant operating time has not exceeded the predetermined time, returning to step a); and f) when constant output is not set (OFF) at step a), returning to step a) without setting (OFF) control output and stimulation output so that the receiver is not operated.

5. The method according to claim 4, wherein step c) comprises:

c1) if it is determined that the stimulation output is set (ON), the receiver outputting a low-frequency stimulation at a period of 30 msec to 40 msec; and c2) if it is determined that the stimulation output is released (OFF), dividing a release (OFF) time for the stimulation output into a plurality of (n) time steps having predetermined intervals ranging from 55 msec to 125 msec, and selecting and sequentially setting the release time steps.

6. The method according to claim 5, wherein step c2) is configured such that, when the release (OFF) time for the stimulation output includes a plurality of (n) time steps, the time steps sequentially increase from a minimum value to a maximum value (for example, 1=55 msec, 2=, . . . , n=125 msec), and sequentially decreases from the maximum value to the minimum value (n=125 msec, n−1=, . . . , 2=, 1=55 msec) when the time steps reach the maximum value.

7. The method according to claim 4, wherein the constant operating time for the control output is 12 seconds.

* * * * *